US005266000A

United States Patent [19]

LeBlanc, Jr.

[11] Patent Number: 5,266,000

[45] Date of Patent: Nov. 30, 1993

[54] ADAPTER APPARATUS FOR REFUSE HAULING VEHICLE

[75] Inventor: Charles J. LeBlanc, Jr., Chelmsford, Mass.

[73] Assignee: Kartlift Systems, Westford, Mass.

[21] Appl. No.: 832,405

[22] Filed: Feb. 7, 1992

[51] Int. Cl.$^5$ .............................................. B65G 67/04

[52] U.S. Cl. .................................... 414/408; 294/68.3

[58] Field of Search ................................ 414/406–408, 414/419–421, 303, 607, 608, 621, 622; 294/68.3

[56] References Cited

U.S. PATENT DOCUMENTS

| | | | |
|---|---|---|---|
| 2,683,544 | 7/1954 | Linde | 414/420 X |
| 3,016,157 | 1/1962 | Brisson | 414/408 |
| 4,479,751 | 10/1984 | Wyman et al. | 414/406 |
| 4,673,327 | 6/1987 | Knapp | 414/408 |
| 4,687,405 | 8/1987 | Olney | 414/408 |
| 4,844,682 | 7/1989 | Edelhoff | 414/408 |
| 4,966,514 | 10/1990 | Knapp | 414/421 X |
| 5,024,573 | 6/1991 | Redding et al. | 414/408 |
| 5,026,241 | 6/1991 | Wyman | 414/406 X |
| 5,033,930 | 7/1991 | Kraus | 414/408 |

FOREIGN PATENT DOCUMENTS

| | | | |
|---|---|---|---|
| 0292866 | 11/1988 | European Pat. Off. | 414/421 |
| 0413400 | 2/1991 | European Pat. Off. | 414/408 |
| 3024081 | 1/1981 | Fed. Rep. of Germany | 414/408 |
| 2165814 | 4/1986 | United Kingdom | 414/406 |
| 2228248 | 8/1990 | United Kingdom | 414/408 |

OTHER PUBLICATIONS

Heil Advertisement for the SmartSystem, *Waste Age*, vol. 23 No. 2, Feb. 1992 issue.

Perkins Advertisement, *Waste Age*, vol. 23, No. 2 Feb. 1992 issue.

Zoeller Advertisement, *Waste Age*, vol. 23, No. 2 Feb. 1992 issue.

Brochure for Front Load Lifter, Model No. 3060-0-0-1000 of Toter Incorporated, P.O. Box 5338, Statesville, North Carolina 28677, Apr. 1989.

*Primary Examiner*—David A. Bucci

*Attorney, Agent, or Firm*—Lahive & Cockfield

[57] ABSTRACT

An adapter apparatus for use with refuse hauling vehicles having a front end trash loading system enables the vehicle to empty both large and small trash receptacles with the trash loading system. The adapter apparatus includes a support frame which mounts to the trash loading system and a clamping mechanism which is able to grasp and secure trash receptacles. Once the trash receptacle is secured by the clamping mechanism, the front end trash loading system is able to be operated in the normal manner by lifting the receptacles over the cab of the vehicle and depositing the trash in the rear of the vehicle.

19 Claims, 7 Drawing Sheets

ADAPTER APPARATUS FOR REFUSE HAULING VEHICLE

BACKGROUND OF THE INVENTION

This invention relates to adapters for use with refuse hauling vehicles to enable the vehicle to accommodate both large dumpster bins and smaller trash receptacles.

Businesses and residential complexes often use relatively large containers for trash collection. Among the containers used are large, rectangular metal boxes which typically have dimensions of about four feet in height, five feet in width and five feet in depth. These are often referred to as "dumpsters". In addition, smaller trash receptacles are used which are generally constructed of plastic and have dimensions of about three and one-half feet in height, and about two and one-half feet in both width and depth at their upper end. Such plastic containers typically have capacity of up to two hundred pounds.

Refuse hauling trucks are specially equipped with a front end trash loading system which is used to collect and dispose of trash which is held in such containers. The front end trash loading system includes a system of pistons and lift arms which are able to pivot between positions in front of and above the truck. Such a system can include extension arms, separated by about 6 feet, which are positioned to extend forward of the truck for a distance of about five feet. The extension arms are adapted to engage the large metal dumpsters so the dumpster may be lifted upwardly over the cab of the vehicle, dumping the trash in an open, top portion of the vehicle. Such a front end trash loading apparatus is well suited for use with large metal dumpster bins, but is not practical for use with smaller barrel-like trash collection bins.

Waste disposal companies typically operate a fleet of large, front end loading trucks to accommodate handling of large dumpsters. Because these trucks cannot handle the smaller dumpster bins, which are too heavy to lift manually, a separate fleet of trucks must often be used for such applications. The use of such an additional fleet is an obvious economic disadvantage. Moreover, the smaller trucks have a much lower trash capacity and must be emptied frequently. This requires waste disposal companies to experience lower efficiency and to incur additional labor costs.

Some devices are known which may be used with side- or rear-loading trash collection trucks to facilitate the dumping of trash from smaller (200 pound capacity) trash bins. These, however, are not practicable for use with larger front-end loading trucks. Further, these devices typically handle only one container at a time and require an attendant to secure each container within the device.

There is thus a need for an apparatus which enables trash disposal trucks, particularly front-end loading trucks, to accommodate both large and small dumpster containers without the need for continuous equipment modifications and adjustments.

Accordingly, it is an object of the invention to provide a device which increases the versatility and efficiency of a front end trash loading trash system used with trash collection vehicles. Another object is to provide an adapter apparatus which enables front end trash loading systems to lift and empty both large metal dumpsters, and smaller refuse containers. Other objects will be apparent to one skilled in the art upon reading the following disclosure.

SUMMARY OF THE INVENTION

The invention relates to an adapter apparatus for use with refuse hauling vehicles equipped with front end trash loading systems to enable the truck to handle refuse receptacles of varying sizes. Front end trash loading systems typically are able to engage and dump large dumpster bins. The present invention provides an adapter apparatus which is used in association with a front end trash loading system. The adapter enables the system to engage smaller trash containers (such as 200 pound capacity trash bins). Upon engagement of these smaller bins by the adapter, the bins can be lifted and emptied by the normal operation of the front end trash loading system. With the adapter in place, the system is able to handle either large dumpsters or smaller trash receptacles without further equipment modifications or adjustments.

The adapter apparatus of this invention comprises a support frame which is adapted to mount upon a portion of a front end trash loading system. The adapter also comprises a clamping mechanism, mounted upon the support frame, which assists in engaging and securing a refuse receptacle. The clamping mechanism includes an upper catch device which is adapted for vertical movement to engage a portion of the receptacle, a lifting means for raising the catch device, and an actuating means for imparting vertical motion to the lifting means and to the catch device.

The lifting means may comprise at least one support arm having a first end pivotally secured to the support frame and the second end free of the support frame. The actuating means may comprise a piston having one end pivotally secured to the support frame and a second end free of the support frame. The second ends of each of the lifting means and the actuating means are preferably adjacent each other and pivotally secured to a device such as a cam which enables substantially vertical movement of the catch device. The invention also comprises a source of hydraulic or pneumatic pressure, a hydraulic or pneumatic line, and a control apparatus to provide the force to drive the actuating means. In a preferred embodiment the invention also comprises a lower catch device, in vertical alignment with the first catch device, which is adapted to engage and secure another portion of a refuse receptacle.

DETAILED DESCRIPTION OF THE INVENTION

Figure 1A:
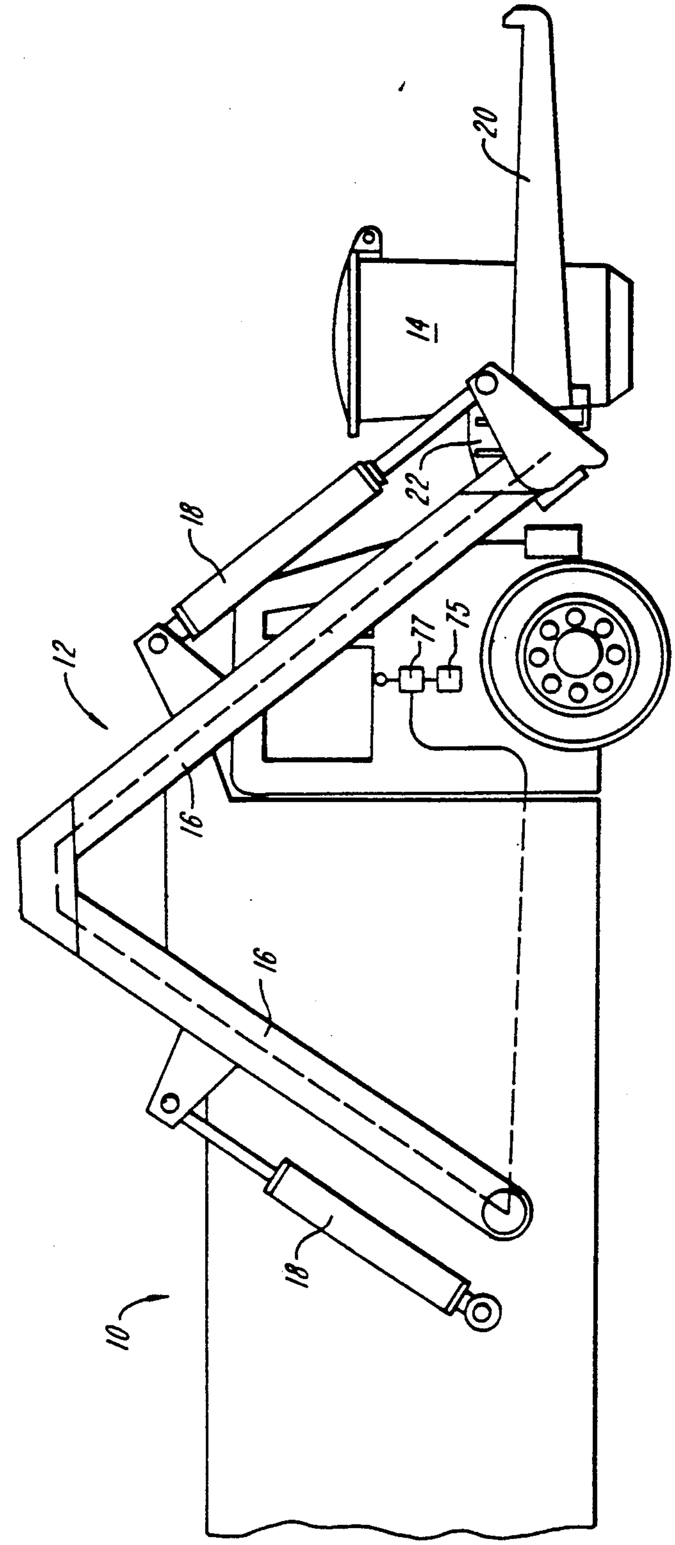
FIGS. 1A and 1B illustrate a refuse hauling truck equipped with a front-end trash loading system to which a small trash receptacle is secured.
Figure 1B:
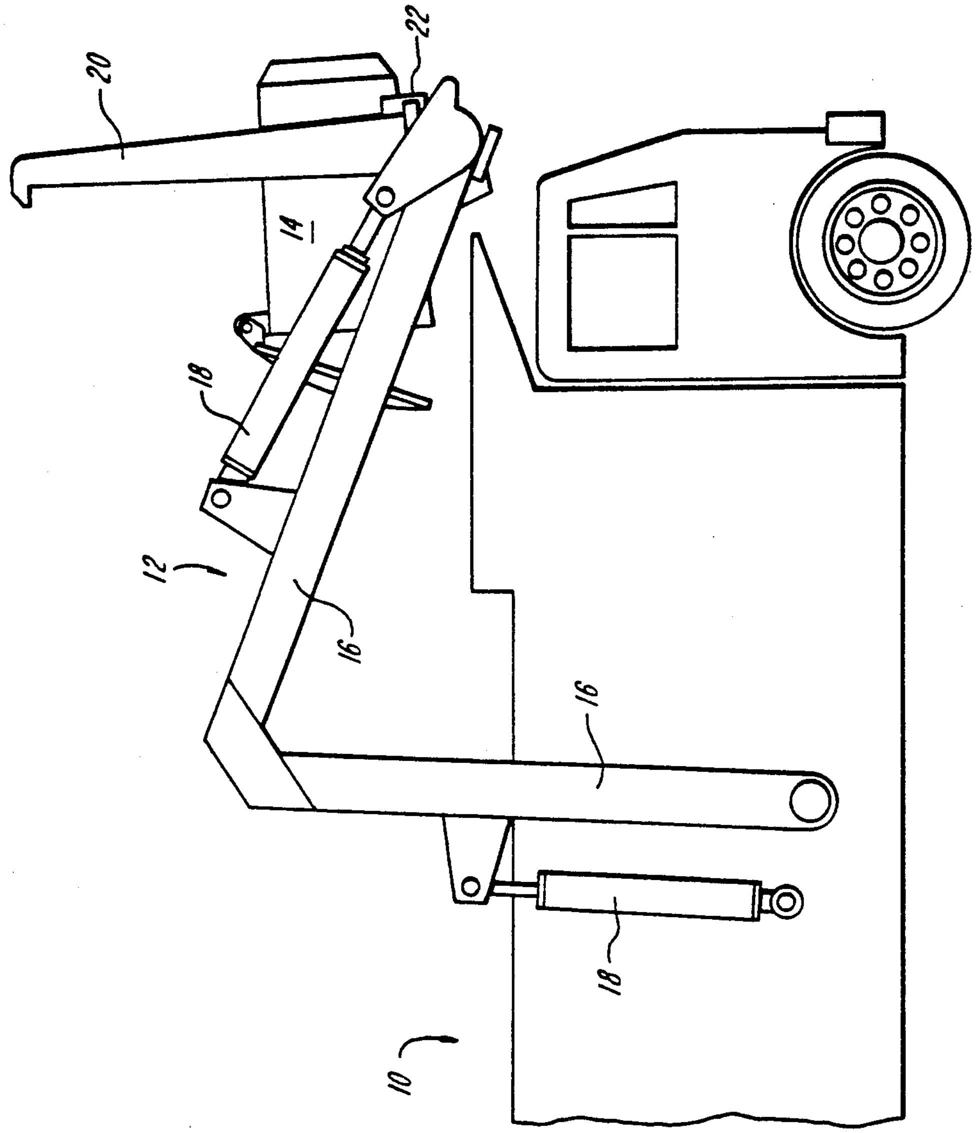

FIGS. 1A and 1B illustrate a refuse collection truck 10, equipped with a known front end trash loading system 12, engaging and lifting a pair of relatively small trash receptacles 14. Truck 10 has a trash loading system 12 which includes lifting arms 16 and lifting pistons 18. The known front end trash loading system 12 also includes extension arms 20 which, in the lowered position as shown in FIG. 1A, are substantially horizontal. Loading system 12 is specifically adapted to engage a large, substantially rectangular trash dumpsters (not shown) with extension arms 20, and to lift and empty the dumpster within the back portion of the truck. Trucks which are so equipped can only accommodate large dumpsters with suitable dimensions to fit between and to be engaged by extension arms 20. Trucks having such a system cannot lift and empty smaller trash receptacles, such as 200 pound-capacity, barrel-like trash receptacles which are now in common use.

The front end trash loading system 12 secured to truck 10 and illustrated in FIGS. 1A and B has been supplemented with adapter apparatus 22 which enables the lifting system 12 to engage, lift and empty smaller trash receptacles 14 as well as the large receptacles (not shown). Typically, two smaller containers 14 can be handled simultaneously by a truck utilizing the adapter apparatus of the invention. No equipment modifications or alterations are necessary for the system 12 to engage and lift large dumpsters while the adapter 22 is in place.

Figure 2:
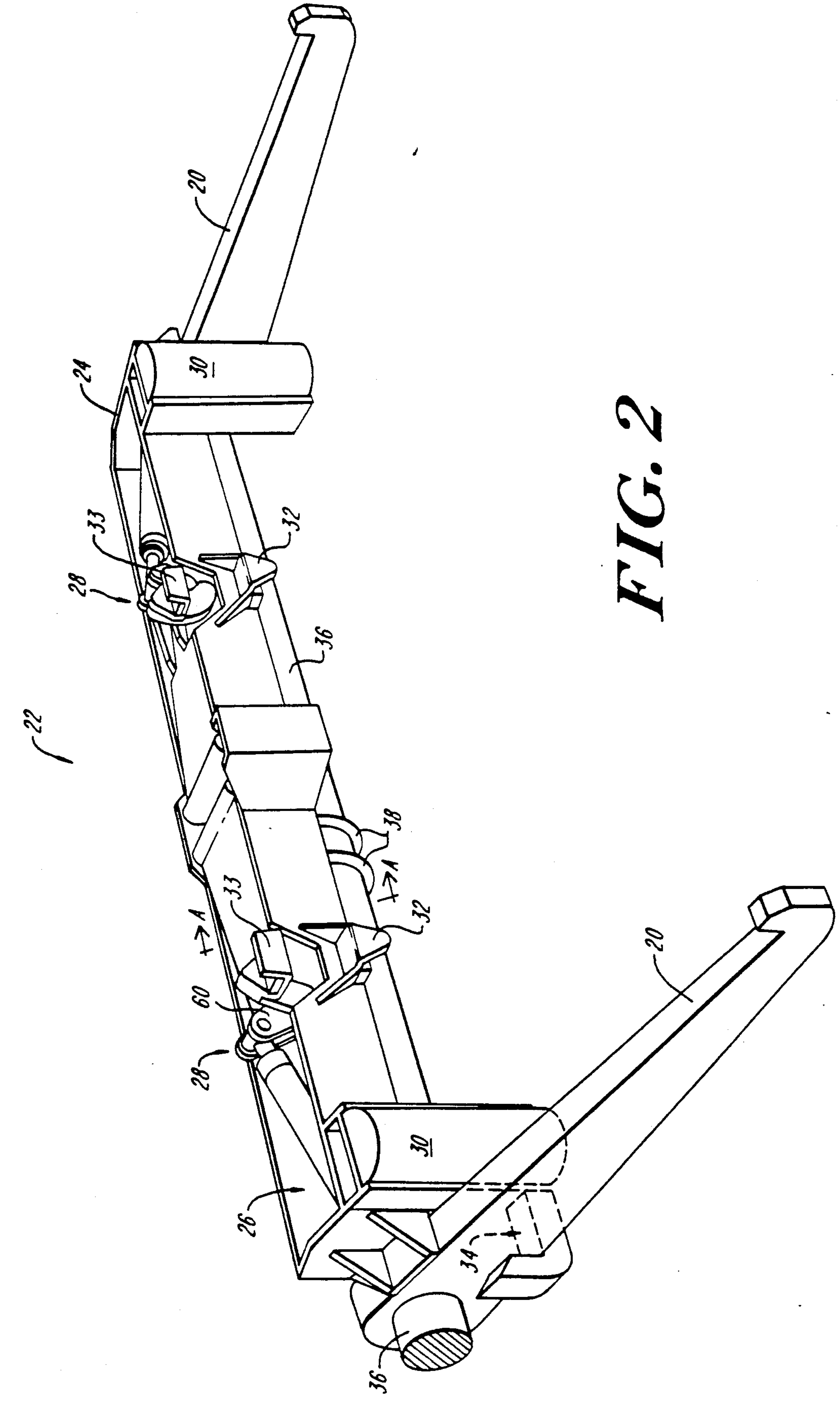
FIG. 2 is a front, perspective view showing the adapter of the invention affixed to a portion of a front-end trash loading system.
Figure 3:
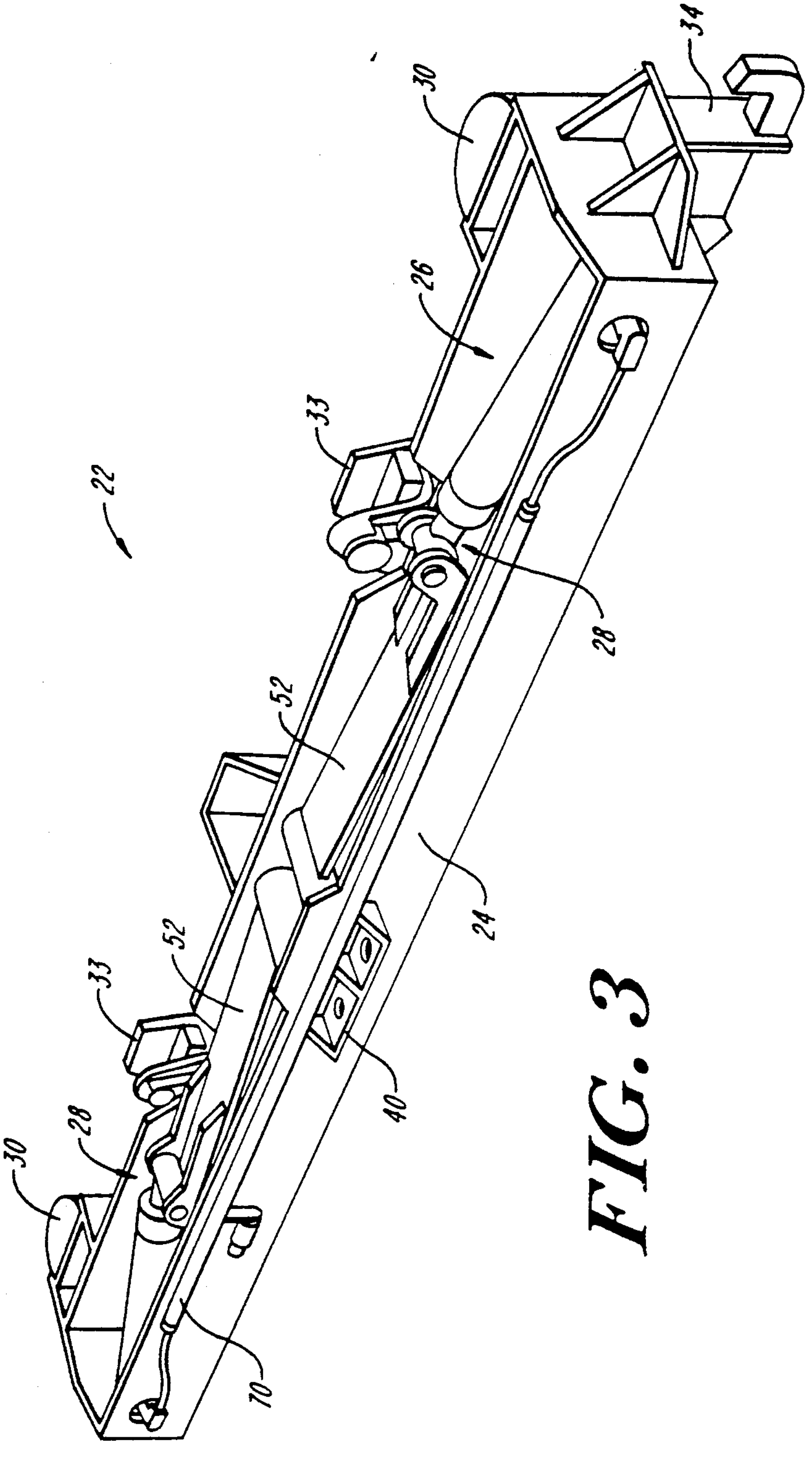
FIG. 3 is a rear perspective view of the adapter apparatus illustrated in FIG. 2.

The adapter apparatus 22, as illustrated in FIGS. 2 and 3, comprises a support frame 24 which includes an open, upwardly facing channel 26. A clamping mechanism 28 is disposed within channel 26 of support frame 24. Clamping mechanism 28 is adapted to engage and secure smaller trash receptacles 14, allowing them to be lifted and emptied by the front-end trash loading system 12. Typically, two separate clamping mechanisms 28 are mounted adjacent each other within the channel 26 of frame 24.

Figure 5:
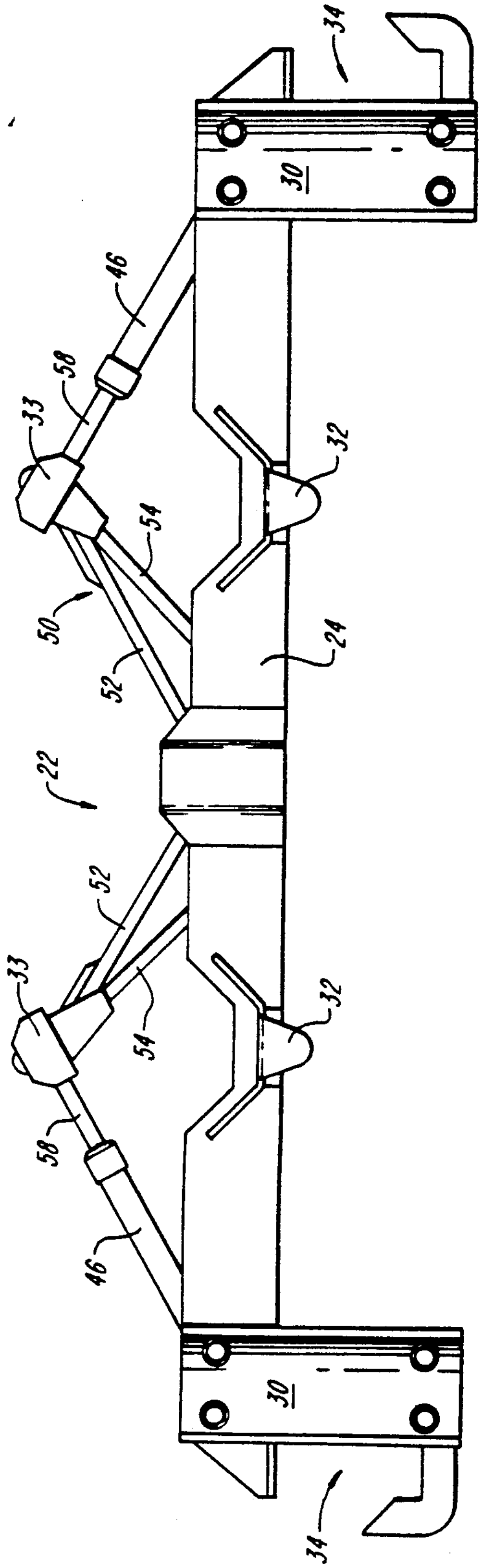
FIG. 5 is a front view of the adapter apparatus illustrated in FIG. 2, showing the clamping mechanism in an elevated position.

The front end of the adapter apparatus 22, as illustrated in FIGS. 2 and 5, preferably includes bumpers 30 and a lower catch device 32. Preferably, the lower catch device 32 is permanently affixed to the front end of the support frame and comprises a downwardly projecting claw. An upper catch device 33, which preferably comprises an upwardly projecting claw member, is pivotally connected to a portion of the clamping mechanism 28 at a position directly above the lower catch device. The lower and upper catch devices 32, 33 cooperate to engage and secure a portion of a smaller trash receptacle 14 to be lifted by system 12.

Figure 6:
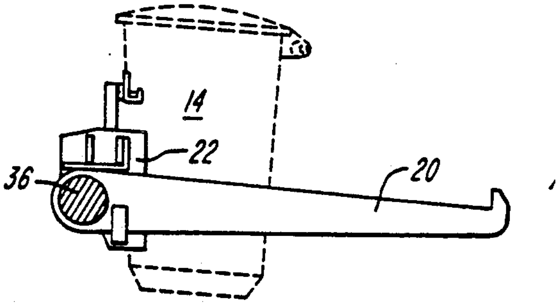
FIG. 6 is a side view of a portion of the front end trash loading system with the adapter apparatus of the invention secured to a small trash receptacle.
Figure 9:
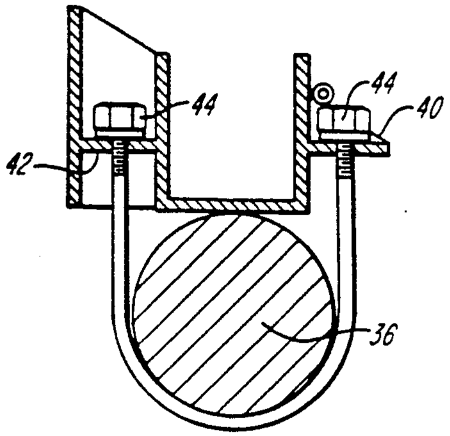
FIG. 9 is a side sectional view of the adapter apparatus shown in FIG. 2, along lines A—A.

As noted, the adapter 22 can be mounted upon a front end trash loading system 12 of a trash hauling truck by mating a front portion of extension arms 20 within mounting sleeves 34 of the adapter 22. Thereafter, the adapter can be rearwardly displaced along the extension arms 20 until it becomes positioned over a mounting member 36 of the trash loading system, as illustrated in FIGS. 2, 6 and 9. The adapter 22 may be secured to the mounting member 36 by a suitable fastening device, such as a U-bolt 38. As shown in FIGS. 2 and 9, the U-bolt 38 extends around member 36 and is secured to flanges 40, 42 by nuts 44.

Although the adapter 22 of the invention is illustrated in use with a specific type of front end-mounted trash loading system, the adapter may be used with virtually all such trash loading systems. One of ordinary skill in the art will readily appreciate any modifications to the present adapter to effect use with other front end trash loading systems.

The clamping mechanism 28 of adapter 22 is further illustrated in FIGS. 2 and 3. Clamping mechanism 28 serves to facilitate the vertical movement of the upper clamping device 33 such that the lower and upper clamping devices cooperate to engage and secure trash receptacles to enable the front end trash loading system to lift and empty their contents into a refuse handling vehicle. In one embodiment the clamping mechanism 28 may comprise a piston 46, the base 48 of which is pivotally connected within channel 26 of the support frame. Opposite the piston 46 is a support arm system 50 which preferably comprises arms 52, 54. The base of each support arm is pivotally connected within the channel 26 of the support frame 24 adjacent a center line 56 of the adapter. The distal end of a piston rod 58 which extends from piston 46 is pivotally connected to distal ends of arms 52, 54.

Figure 4:
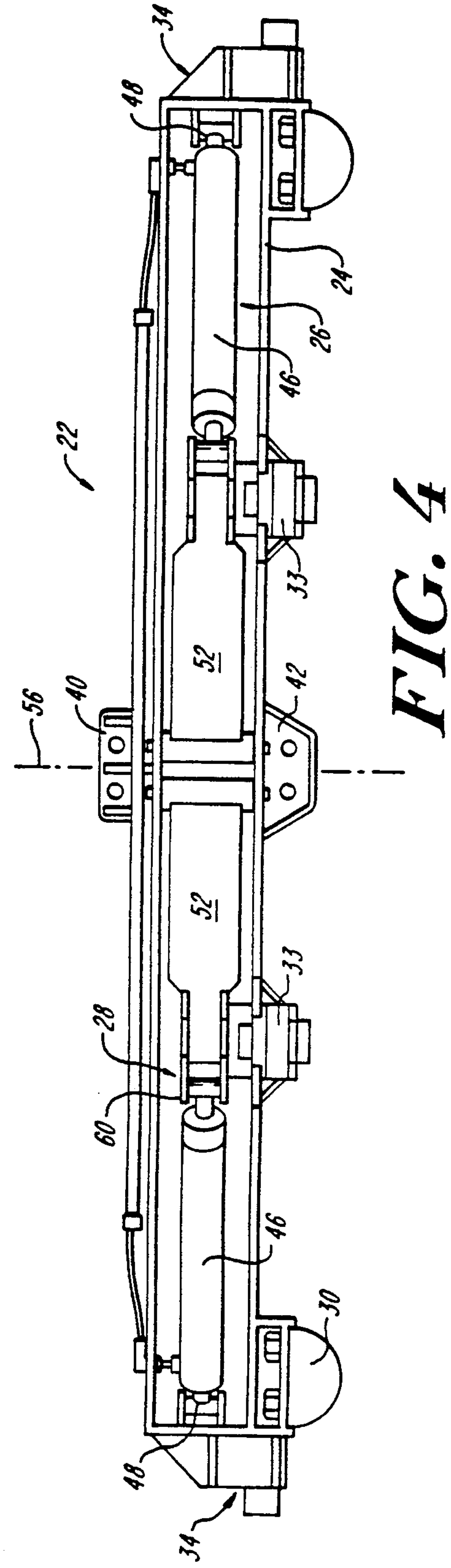
FIG. 4 is a top view of the adapter apparatus illustrated in FIG. 2.

Referring to FIGS. 2, 4 and 5, the distal end of the piston rod 48 is pivotally connected to the distal ends of arms of 52, 54 through a connector flange 60 of arm 52. The upper catch device 33 may also be pivotally connected to flange 60. The connector flange 60 preferably has a cam-like construction to enable the upper catch 33 to be in substantial vertical alignment with the lower catch device 32 when the clamping mechanism 28 is elevated.

Figure 10:
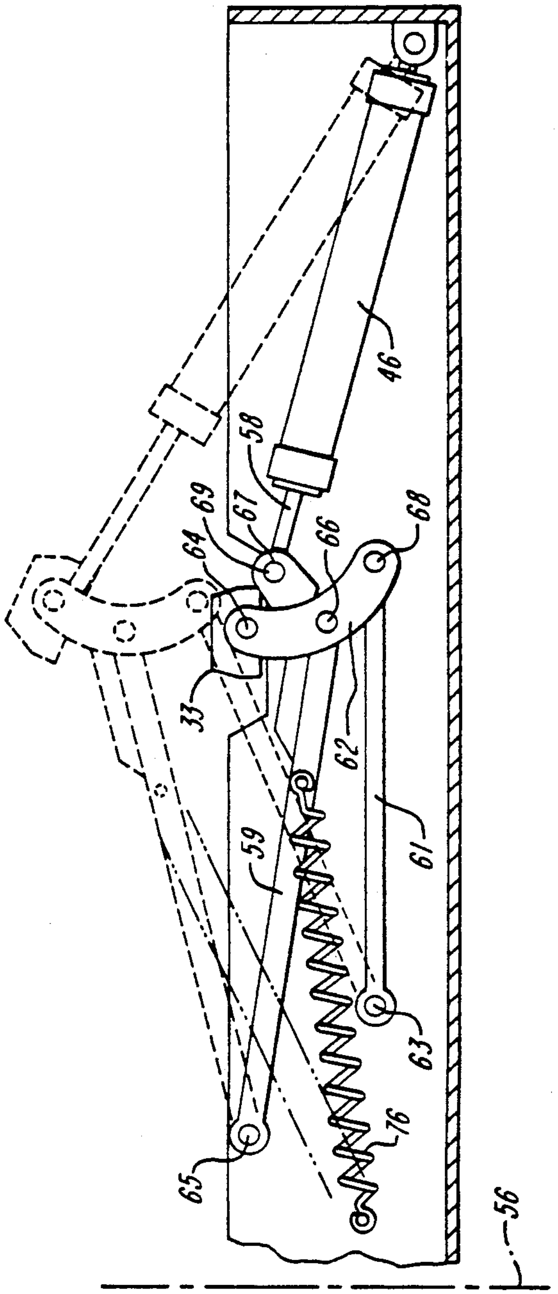
FIG. 10 is a plan view showing another embodiment of a clamping mechanism useful with the adapter.

FIG. 10 illustrates another embodiment of the clamping mechanism 28 of the invention in which the distal ends of piston rod 58 and arms 59, 61 are pivotally connected to a separate cam element 62. As illustrated, cam element 62 is essentially C-shaped, having upper 64, central 66 and lower 68 apertures. The distal end of piston rod 68 is pivotally secured to a flange 69 appended to arm 59, by way of aperture 67. When the clamp mechanism is in the lowered position (as shown in FIG. 10) arm 61 is substantially horizontally oriented and extends from a base 53 adjacent center line 56 of the adapter, to its point of connection at lower aperture 68. Arm 59 also extends at a slight angle from its base 65 (somewhat closer to the center line than is arm 61), to its point of connection at aperture 66 of cam 62. Although not illustrated in FIG. 10, upper catch device 33 preferably is pivotally attached to aperture 64 of cam 62.

Although not shown in FIG. 10, upper catch device 33 may be pivotally secured to arm 59 or to cam 62. The cam 62 is designed to ensure that upon elevation of the clamping mechanism, by extension of piston rod 58, the lower and upper catch devices will remain in substantial vertical alignment.

FIG. 10 also illustrates a further embodiment of the invention in which arms 59, 61 are spring-biased to a lowered position, through the use of spring 76. Thus, upon release of hydraulic or pneumatic pressure upon piston 46, the upper catch device 33 will be rapidly lowered. Various other mechanisms may also be used to bias the arms 59, 61 to the lowered position. Also, the piston itself can be biased to the closed or lowered position.

Although the clamping mechanism has been described with respect to the two specific embodiments described above, it is understood that various modifications may be made to the constructions described in these embodiments. Moreover, the clamping mechanism may comprise virtually any construction which enables it to grasp and secure smaller trash receptacles. For example, the upper catch device may simply be mounted upon a track such that when actuated it travels vertically so as to engage a portion of a trash receptacle.

Each adapter 22 preferably includes two clamping mechanisms 28. Piston bases 48 of each piston 46 may be secured adjacent the outer edge of the support frame as illustrated in FIGS. 2, 4 and 5, with the base of arms 52, 54 secured adjacent centerline 56. Alternatively, this configuration may be reversed so that the base 48 of each piston 46 is secured adjacent the centerline 56 and the bases of arms 52, 54 are secured adjacent the outer edges of support frame 24.

Pistons 46 may be actuated by hydraulic pressure or, more preferably, by pneumatic pressure. The source 75 of hydraulic fluid or pneumatic pressure typically is mounted on the truck (shown in FIG. 1A) and is communicated to the piston through line 70 which is attacted to the rear of support frame 24 as illustrated in FIG. 3. Various control mechanisms 77 may be used to control the delivery of pressure through line 70 to pistons 46. Preferably control switches are located within the cab of the truck for operator convenience.

Figure 8A:
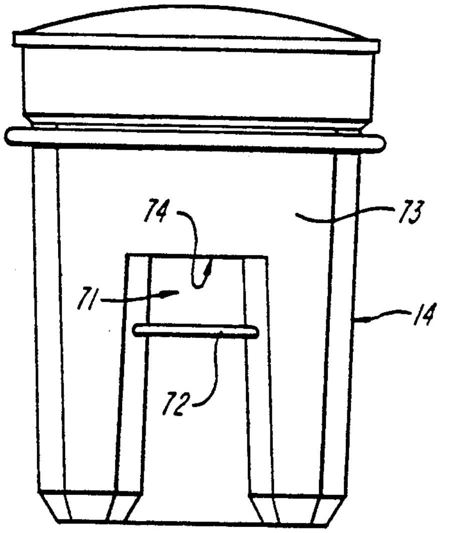
FIGS. 8A and 8B are rear views illustrating various constructions for smaller trash receptacles of the type which may be accommodated by the adapter apparatus of the invention.
Figure 8B:
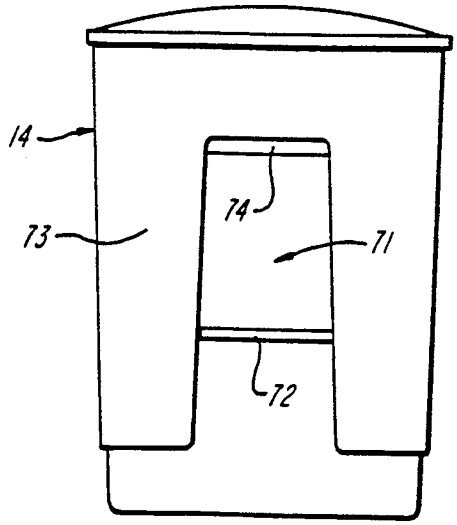

As noted, the adapter apparatus of the invention is well suited for use in engaging and emptying smaller trash receptacles. Exemplary trash receptacles which may accommodated by the adapter apparatus of the invention are illustrated in FIGS. 8A and 8B. The rear surface 73 of receptacles 14 include a lower bar 72 and upper lip or bar 74.

Figure 7:
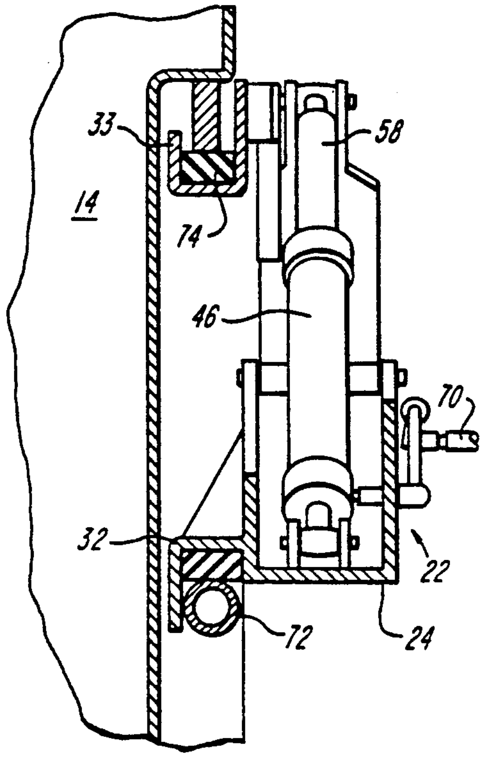
FIG. 7 is a side sectional view showing the adapter apparatus of the invention, secured to a smaller trash receptacle.

FIG. 7 illustrates the operation of the adapter apparatus 22 in engaging and securing smaller trash receptacles 14. Typically, the truck approaches a pair of trash receptacles which are oriented so that the rear surface 73 of the receptacles 14 faces the front end of the truck. The truck proceeds forward such that the receptacles are positioned between extension arms 20, and the lower and upper catch devices are positioned so that they are able to extend within a depression 71 formed in rear surface 73 of receptacle 14. The upper and lower regions of the depression 71 are bounded by lip 74 and bar 72, respectively. When the catch devices are properly positioned, the operator of the vehicle activates the clamping mechanism by a control mechanism, such as a switch (not shown) which causes pneumatic or hydraulic pressure to actuate piston 46. Piston rod 48 thus extends upwardly, raising upper catch devices 33 to the extent that the upward facing claw of the catch device 33 engages lip 74 of the receptacle. As the receptacle 14 is raised by the action of the clamping mechanism, the lower catch device 32 engages bar 72. The clamping mechanism 28 is then locked in position. At this point the receptacles 14 are securely engaged by the clamping mechanism and the front end trash loading system 12 may operate as shown in FIGS. 1A and 1B to move the receptacle upwardly and over the roof of the cab, emptying the contents of the receptacles into the truck. The pressure on the pistons may be relieved once the receptacles are replaced on the ground, causing the clamping mechanism to release the trash receptacles.

No specific dimensions are required for the adapter apparatus of the invention. However, the adapter should be constructed so as to be mounted on an existing front end trash loading system. In addition, the clamping mechanism should be constructed so that the distance between the catch devices, when fully extended, is sufficient to securely engage a trash receptacle.

The following general dimensions provide an example of one embodiment of an adapter apparatus constructed according to the present invention. The piston may have a stroke of approximately 8 to 10 inches and an inner bore of $1\frac{3}{4}$ to $2\frac{1}{2}$ inches. The upper and lower catch devices of the clamping mechanism typically are separated by a distance of about $5\frac{1}{2}$ inches when the clamping mechanism is in the lowered position. Upon extension of the clamping mechanism the distance between the catch devices increases to approximately $15\frac{1}{2}$ inches. With reference to FIG. 10 arm 59 (and arm 52 in FIG. 5) may have a length of about $15\frac{1}{2}$ inches while arm 61 (and arm 54 in FIG. 5) may have a length of about $13\frac{1}{2}$ inches. The vertical distance between the base 53 of arm 61 and the base 65 of arm 59 is about 3 to $3\frac{1}{4}$ inches. Generally the base of the support frame is about 4 inches in width.

One of ordinary skill in the art will appreciate both the hydraulic and pneumatic pressure levels which can be used to operate the clamping mechanism. A pneumatically controlled system preferably operates at about 90 to 125 psi.

Various modifications may be made in the adapter apparatus of the invention without departing from the scope of the invention.

What is claimed is:

1. An adapter apparatus for use with a refuse hauling vehicle to enable the handling of refuse receptacles of varying sizes, comprising:

a support frame, elongated along a longitudinal axis, having two longitudinal ends and adapted to mount upon a front end trash loading system having extension arms secured to a refuse hauling vehicle, a selectively operable clamping mechanism, mounted upon the support frame, for engaging and securing a refuse receptacle, the clamping mechanism including i) a first catch device adapted for substantially vertical movement to engage a portion of the receptacle, ii) a lifting means for raising the first catch device, the lifting means having one end secured to the support frame, iii) an actuating means for imparting substantially vertical motion to the lifting means and first catch device;

said support frame including mounting means on each of said longitudinal ends for slidingly engaging and bearing upon said extension arms; and fastening means for securing the support frame to the trash loading system.

2. The apparatus of claim 1 further comprising a second catch device, in vertical alignment with the first catch device, adapted to engage and secure a refuse receptacle.

3. The apparatus of claim 2 wherein the second catch device has a downwardly projecting claw.

4. The apparatus of claim 3 wherein the second catch device is stationary relative to the support frame.

5. The apparatus of claim 1 wherein the support frame includes at least two clamping mechanisms, mounted adjacent each other on the support frame.

6. The apparatus of claim 1 wherein the support frame has an upwardly facing channel within which the clamping mechanism is disposed.

7. The apparatus of claim 3 wherein the first catch device has an upwardly projecting claw.

8. An adapter apparatus for use with a refuse hauling vehicle to facilitate the handling of refuse receptacle of varying sizes, comprising:

a support frame, elongated along a longitudinal axis, having two longitudinal arms secured to a refuse hauling vehicle;

a selectively operable clamping mechanism, mounted upon the support frame, for engaging and securing a refuse receptacle, the mechanism including i) a first catch device adapted for substantially vertical movement to engage a portion of the receptacle, ii) a lifting means for elevating the first catch device, the lifting means having at least one support arm pivotally connected between the support frame and a piston means for elevating the lifting means;

said support frame including mounting means on each of said longitudinal ends for sliding engaging and bearing upon said extension arms;

a means for actuating the piston means to impart movement to the lifting means and the first catch device;

means for activating the actuating means; and fastening means for securing the support frame to the trash loading system.

9. The apparatus of claim 8 further comprising a second catch device, in vertical alignment with the first catch device, adapted to engage and secure a refuse receptacle.

10. The apparatus of claim 9 wherein the second catch device has a downwardly projecting claw.

11. The apparatus of claim 10 wherein the second catch device is stationary relative to the support frame.

12. The apparatus of claim 8 wherein the support frame houses at least two clamping mechanisms, mounted adjacent each other on the support frame.

13. The apparatus of claim 8 wherein the support frame has an upwardly facing channel within which the clamping mechanism is disposed.

14. The apparatus of claim 10 wherein the first catch device has an upwardly projecting claw.

15. The apparatus of claim 8 wherein the lifting means comprises a pair of support arms each having first ends pivotally secured to the support frame.

16. The apparatus of claim 8 wherein the piston means comprises a piston having a base pivotally secured to the support frame, and an extensible piston rod having a distal end in pivotal connection with a second end of each support arm such that extension of the piston rod elevates the second end of each support arm and raises the first catch device in a substantially vertical direction without any significant horizontal direction component.

17. The apparatus of claim 16 wherein the distal end of the piston rod is pivotally connected to the second end of each support arm through a cam means for facilitating the substantially vertical movement of the first catch device.

18. The apparatus of claim 17 wherein the means for actuating the piston means comprises a selectively operable source of pressurized air communicated to the piston means through an air line.

19. The apparatus of claim 17 wherein the means for actuating the piston means comprises a selectively operable source of hydraulic fluid communicated to the piston means through a hydraulic fluid line.

* * * * *